May 31, 1932.
A. O. HURXTHAL
Re. 18,486
BALL BEARING HOUSING
Original Filed May 13, 1927
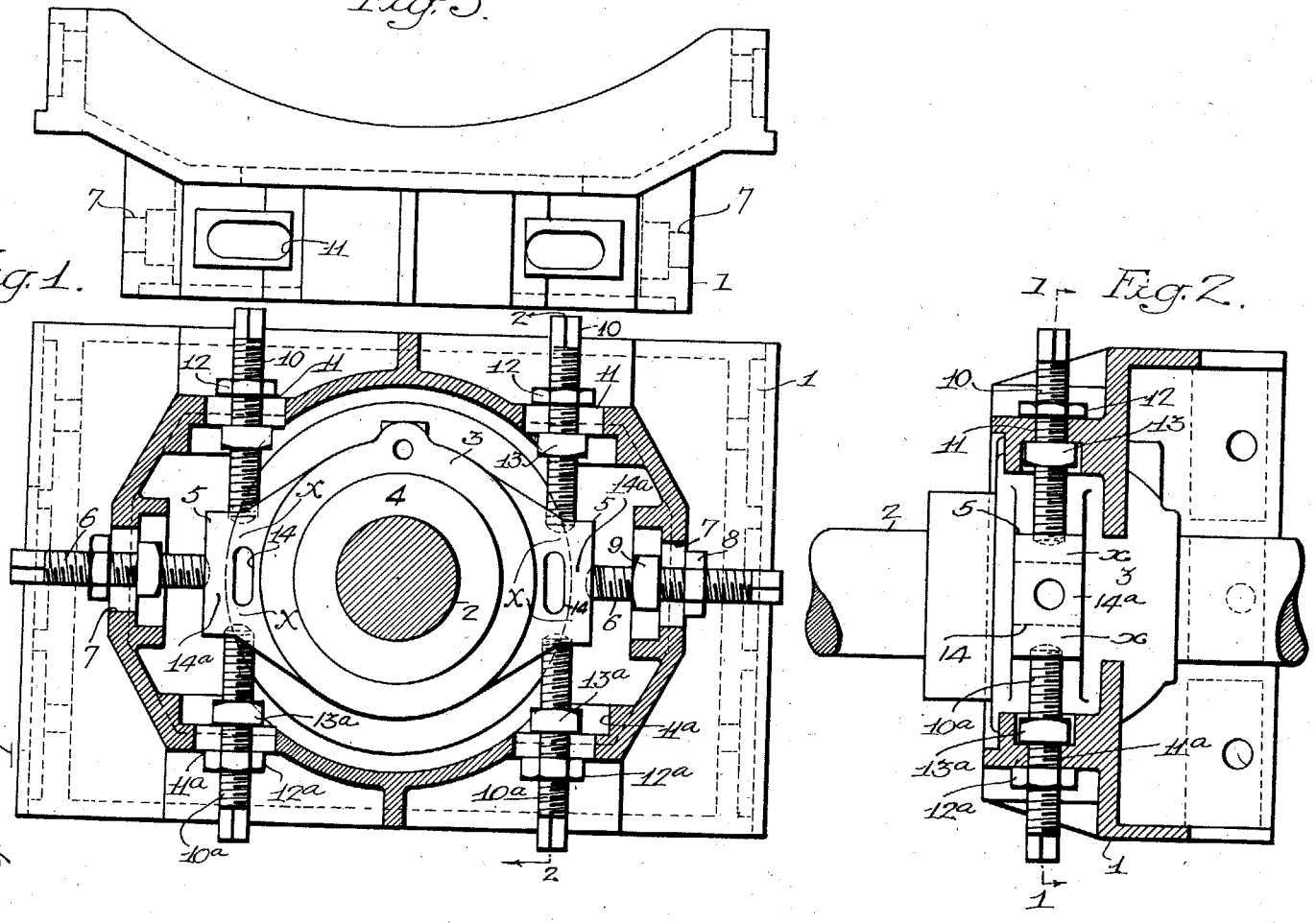
Inventor:
Alpheus O. Hurxthal
by his Attorneys
Howson + Howson Reissued May 31, 1932

Re. 18,486

UNITED STATES PATENT OFFICE

ALPHEUS O. HURXTHAL, OF PHILADELPHIA, PENNSYLVANIA, ASSIGNOR TO PROCTOR & SCHWARTZ, INCORPORATED, OF PHILADELPHIA, PENNSYLVANIA, A CORPORATION OF PENNSYLVANIA

BALL BEARING HOUSING

Original No. 1,706,232, dated March 19, 1929, Serial No. 191,111, filed May 13, 1927. Application for reissue filed March 18, 1931. Serial No. 523,609.

This invention relates to that general type of shaft hanger embodying a bearing in which the shaft is operatively mounted, the bearing in turn being supported by a frame which is adapted to be rigidly secured to a suitable support; and the bearing being clamped in the frame, or rendered adjustable relative to the frame, by one or more screws in threaded engagement with the frame and having one end pressing against the bearing in a direction substantially at right angles to the axis of the shaft.

Excessive pressure applied to the bearing by the holding screw or screws will distort the bearing to such an extent that the shaft will not operate freely therein.

In bearings of the anti-friction type, employed for rotatably supporting a shaft, the bearing comprises a housing for an outer raceway in which the anti-friction elements travel, the inner raceway for these elements being carried by the shaft.

Such a housing usually consists of an annular shell, in the periphery of which is formed sockets which are adapted to receive the ends of the holding or adjusting screws.

When excessive pressure is applied to the housing, by the screws, the shell, and consequently the outer raceway carried thereby, are distorted and this distortion usually assumes the form of an inward bulging of the shell and raceway at points substantially in alignment with the axes of the screws.

This distortion is caused by localization of the stresses produced by each screw, such stresses being directed in lines contiguously aligned with the axis of the screw and lines paralleling the axis of the screw, the force of which diminishes in proportion to their radial disposition relative to the axis of the screw.

The object of my invention is to construct the housing in such a manner that the stresses therein produced by the holding screws will not be of a localized nature, and the lines of stress will not be in direct alignment with the axes of the screws, but in place thereof the application of such stresses will be diverted to points disposed at either side of and spaced from the axis of each screw, and these lines of stress will diverge from the said spaced points toward the shaft, being thereby distributed over relatively broad segmental sections of the housing which, due to the substantially equal distribution of the stresses obtained, will eliminate distortion of the housing.

When two screws are employed in direct opposition to each other at opposite sides of the housing respectively, the stresses radiating from the points of application of pressure at the opposite sides of the respective screws will meet at points distributed over a plane intermediate the opposite sides of the housing and at right angles to the aligned axes of the opposed screws. These stresses at the meeting points are of a compressive nature which will also prevent distortion of the housing.

Another object of the invention is to so construct the housing, at and adjacent the points of engagement of the holding screws therewith, that when excessive pressure is applied by the screws the portion of the housing immediately engaged by the housing will yield to a certain extent, thereby aiding in the elimination of distortion of the housing; and if extremely excessive pressure is applied the portion of the housing immediately engaged by the screws will crack thereby relieving the other portions of the housing and indicating to the manufacturers of the device that the person installing or adjusting the elements had applied an abnormal pressure by setting up the one or more of the screws too tightly in an effort to align the shaft without backing off the opposing screw or screws at the opposite side of the housing.

In the accompanying drawings:

Fig. 1 is a sectional view on the line 1—1, Fig. 2, showing a ball-bearing housing in elevation and the carrying frame in section;

Fig. 2 is a sectional view on the line 2—2, Fig. 1, also showing the housing in elevation; and Fig. 3 is a plan view.

The frame 1, in the present instance, is shaped to fit the structural supports of a drying machine, and the shaft 2 is a fan shaft extending into the drier and provided with a fan at its inner end and a driving pulley at its outer end, but it will be understood that the frame can be of any shape, depending upon the machine or apparatus to which it is attached.

The housing 3 for the ball-bearing 4 is shaped, in the present instance, as shown in Figs. 1 and 2, and has laterally extending lugs 5—5 shaped to receive the ends of the adjusting screws.

Holding and adjusting screws 6—6 are arranged in diametrically opposed relation to each other and bear upon the ends of the lugs 5—5 respectively, and by adjusting the screws 6—6, the housing can be moved laterally in one plane.

The screws 6—6 extend through vertical slots 7—7 in the frame 1, and on the screws at each side of the slotted portion of the frame are nuts 8 and 9, for locking the screws in the position in which they are adjusted. The slots 7 allow the housing to be adjusted laterally in a plane at right angles to the first mentioned plane of lateral movement.

In order to adjust the housing in the second said plane, four screws 10—10*a* are provided. The screws 10 bear upon the one surface of the lugs 5—5, and extend through slots 11 in the frame 1. On each screw are nuts 12 and 13 which clamp the screws firmly to the frame after adjustment.

The screws 10*a* extend through slots 11*a* in the frame and bear upon the under side of each of the lugs 5. On the screws 10*a* are nuts 12*a* and 13*a* which confine the screws to the frame after adjustment.

By the above-described construction, the ball-bearing housing can be shifted as described to bring the shaft in proper alignment with the rest of the equipment.

The lugs 5 are made substantial so that any pressure exerted upon the lugs will not disturb the body of the housing and the ball-bearing.

In order to prevent distortion of the housing when excessive pressure is applied to the ends of the lugs 5—5 by the screws 6—6, the lugs are slotted, adjacent their outer ends in a direction at right angles to the axes of the screws 6—6, as indicated at 14—14. The portions 14*a*—14*a* of the lugs 5—5 respectively lying between the slots 14 and the outer ends of the lugs, in effect, function as bridge elements which are connected to the body of each lug at the points *x*—*x*, disposed at either side of the axes of the screws 6—6, therefore, pressure applied to the center of the bridge pieces 14*a* is diverted to points lying at opposite sides of the axes of the screws 6, and the lines of stress instead of being in direct alignment with the axes of the screws 6 will diverge from the points *x*—*x* toward the shaft, being thereby distributed over relatively large segmental sections of the housing which will prevent localization of the stresses and the consequent distortion of the housing.

In some instances, when extremely excessive pressure is applied by turning said screws 6—6, the cast metal between the slot and the end of the screw, of which the bridge elements 14*a* are composed, would give and thereby prevent possible distortion of the housing and bearing.

When it is wished to adjust the housing laterally, the screws 10—10*a* are released from the frame by turning the nuts. Then the screws 6—6 can be turned to shift the housing to the position desired, and after adjustment the several nuts can be tightened.

If the housing is to be adjusted vertically, then the nuts on the screws 6—6 are backed-off and the screws 10—10*a* turned. When the housing has been moved to the position desired, then the nuts are tightened.

I claim:

1. The combination of a frame; a housing mounted in the frame; laterally extending lugs on the housing; adjusting screws bearing against the end of each lug; vertically adjustable screws bearing upon the upper and lower sides of the lugs, the frame being slotted for the passage of the several screws; and nuts on each screw at each side of the slotted portions of the frame for holding the screws after adjustment.

2. The combination of a frame; a housing located in the frame, said housing having a lug at each side; means for vertically adjusting the housing; and means for adjusting the housing laterally including screws bearing against the ends of the lugs, said lugs having slots spaced inwardly from the said ends in line with and substantially at right angles to the axes of the screws.

3. The combination of a frame; a housing located in the frame, said housing having a lug at each side; and adjusting screws bearing against the ends of the lugs, said lugs having slots spaced inwardly from the said ends in line with and substantially at right angles to the axes of the screws.

4. The combination of a frame; a housing located in the frame; a lug on said housing; and a screw carried by the frame and having its end bearing against the end of said lug, said lug having a slot spaced inwardly from said end in line with and substantially at right angles to the axis of said screw.

5. The combination of a supporting frame; a shaft; a housing located in the supporting frame and continuously surrounding said shaft; a screw intermediate the housing and the frame and having threaded engagement with one of said elements; a bridge element carried by the housing and adapted to be engaged intermediate its ends by said screw, said bridge element extending substantially at right angles to the axis of the screw and connected at its opposite ends to said housing.

6. The combination of a supporting frame; a shaft; a housing located in the supporting frame and continuously surrounding said shaft; a screw intermediate the housing and the frame and having threaded engagement with one of said elements; a lug on said housing having an opening in its outer end; and an element bridging said opening and adapted to be engaged intermediate its ends by said screw.

ALPHEUS O. HURXTHAL.